United States Patent

Schuff et al.

[11] 3,897,899
[45] Aug. 5, 1975

[54] PLASTIC FOAM CUP AND METHOD FOR PRODUCING IT

[75] Inventors: Richard W. Schuff; Roy E. Moore; John A. Noel, all of Phoenix; Arthur Fibish, Tempe, all of Ariz.

[73] Assignee: Dart Industries, Inc., Los Angeles, Calif.

[22] Filed: Apr. 8, 1970

[21] Appl. No.: 31,037

Related U.S. Application Data

[62] Division of Ser. No. 730,360, May 20, 1968, abandoned.

[52] U.S. Cl. ............ 229/1.5 B; 229/3.5 R; 264/51; 264/DIG. 9; 264/DIG. 10
[51] Int. Cl.² ........................................ B29D 27/00
[58] Field of Search .......... 264/51, 53, 321, DIG. 9, 264/DIG. 10; 229/1.5 B, 3.5 R

[56] References Cited
UNITED STATES PATENTS

| | | | |
|---|---|---|---|
| 3,045,286 | 7/1962 | Harrison | 264/51 |
| 3,094,449 | 6/1963 | Sisson | 264/53 X |
| 3,125,780 | 3/1964 | Harrison et al. | 264/51 UX |
| 3,200,175 | 8/1965 | Harrison | 264/53 |
| 3,248,461 | 4/1966 | Wiles et al. | 264/53 X |
| 3,368,014 | 2/1968 | Tijunelis | 264/321 X |
| 3,417,169 | 12/1968 | Harrison et al. | 264/51 |

OTHER PUBLICATIONS

Koppers, Co., "Technical Manual Dylite Expandable Polystrene; Product Description and Specifications," Bulletin C–9–273, Chpt. 1A, pp. 1–7, Jan. 3, 1964.

*Primary Examiner*—Philip E. Anderson
*Attorney, Agent, or Firm*—Paul R. Wylie; Leigh B. Taylor; Kenneth J. Hovet

[57] ABSTRACT

A plastic foam cup and method of producing it, said cup having thin walls and of a dimension which does not exceed twice the average diameter of foamed beads of plastic material in said wall, and wherein the structural density of the material of said cup ranges between 55 to 65 grams per liter, and the dimensional wall thickness of said cup ranges between 0.065 inches and 0.075 inches.

5 Claims, 3 Drawing Figures

PLASTIC FOAM CUP AND METHOD FOR PRODUCING IT

BACKGROUND OF THE INVENTION

This is a division of application Ser. No. 730,360, filed May 20, 1968 and now abandoned.

Plastic foam cups are generally quite bulky in proportion to their weight, and consequently are subject to relatively high shipping rates as compared to most articles of commerce. As for example, many of the prior art foamable plastic cups of a size adapted to contain approximately 6 ounces of liquid require almost 22 inches within which 25 of such cups may be packaged in substantially telescopic nested relation to each other. In many instances, the nested cups are surrounded by sheet plastic material as a packaging arrangement for each 25 cups. Such cups, when nested in groups of 25, are placed in cardboard cartons which must be of a dimension great enough to accommodate the full length of the 25 cups in each nest.

Additionally, many prior art plastic foam cups have a surface comprising a high percentage of depression areas which is incompactible with efficient printing or embossing of advertising or other subject matter on the outsides of such cups. Plastic foam cups are highly desirable as an advertising medium, and therefore they have heretofore been difficult to use in this manner due to the fact that the surfaces of such cups have not provided a highly practical surface structure on which printing ink may efficiently be applied, and such surfaces have also been rather difficult to emboss efficiently.

SUMMARY OF THE INVENTION

The present invention relates to a plastic foam cup and method of producing it, and more particularly, to a thin walled plastic foam cup and method of producing it. The cup of the invention comprises very thin wall structure as compared to the wall structures of prior art cups so as to provide for very compact telescopic nesting of a large plurality of cups in a relatively small space as compared to prior cups of comparable capacity. For example, 25 cups of the present invention may be nested in substantially telescopic relation with each other, such that all 25 cups may be disposed in a space less than 16 inches long as compared with comparable capacity cups of the prior art which have heretofore measured almost 22 inches long when in a similarly nested relation. The cups of the present invention have a relatively greater density than comparable prior art cups, and a more dense and smooth surface which provides desirable printability characteristics, and also desirable embossing characteristics. The cups of the present invention are formed of fine mesh foamable plastic beads, such as foamable polystyrene beads with a foaming agent therein. The thin wall structure of each cup of the invention has a thickness which does not exceed a dimension equalling twice the average diameter of the foamed beads in the wall of the cup. Furthermore, the density of the wall structure of the cup ranges between 55 and 65 grams per liter. The wall thickness of the cups of the invention range between 0.065 inches and 0.075 inches as compared to approximately 0.090 inches for prior art cups, all of which indicates the reason for the compact nesting of the cups of the present invention.

In addition to the compactness, relative density, and smooth surfaces of the present cups, they, when adapted to contain approximately 6 ounces of liquid, employ substantially 0.03 grams of material less than comparable prior art cups.

The method for producing cups in accordance with the present invention involves the selection of a mass of plastic beads having a foaming agent therein, such that the mass includes 75 percent to 85 percent of beads of approximately 40 mesh size, and 15 percent to 20 percent of beads of approximately 45 mesh size which are preliminarily thermally expanded to a mesh size ranging between 14 to 30 and a density ranging between 68 and 80 grams per liter, said beads are subsequently cooked in a mold to final foamed size and density by steam having a pressure ranging between 28 P.S.I. and 32 P.S.I.

Accordingly, it is an object of the present invention to provide a plastic foam cup and method of producing it which results in economy of packaging and shipping of such cups, as well as in the saving of materials for producing the cups, and further, results in cups having superior surface density, whereby the external portions of said cups may be efficiently printed and embossed.

Another object of the invention is to provide a plastic foam cup having a novel curved lip portion adjacent the open end of the cup; said curved lip portion extending from a thin wall area of the cup to the open end thereof, and being generally concave about the perimeter of the cup near the open end to provide for a very comfortable engaging portion for a person's lips during the act of drinking from the cup of the invention.

Another object of the invention is to provide a method for producing plastic foam cups, wherein a proper selection of small foamable plastic beads, as well as the maintenance of critical cooking pressures, provides very smooth and dense surfaced cups having very thin walls, and whereby material may be saved in the production of cups according to the invention, as compared to the production of comparable volume prior art cups.

Further objects and advantages of the invention may be apparent from the following specification, appended claims, and accompanying drawings:

DESCRIPTION OF THE PREFERRED EMBODIMENTS

Figure 1:
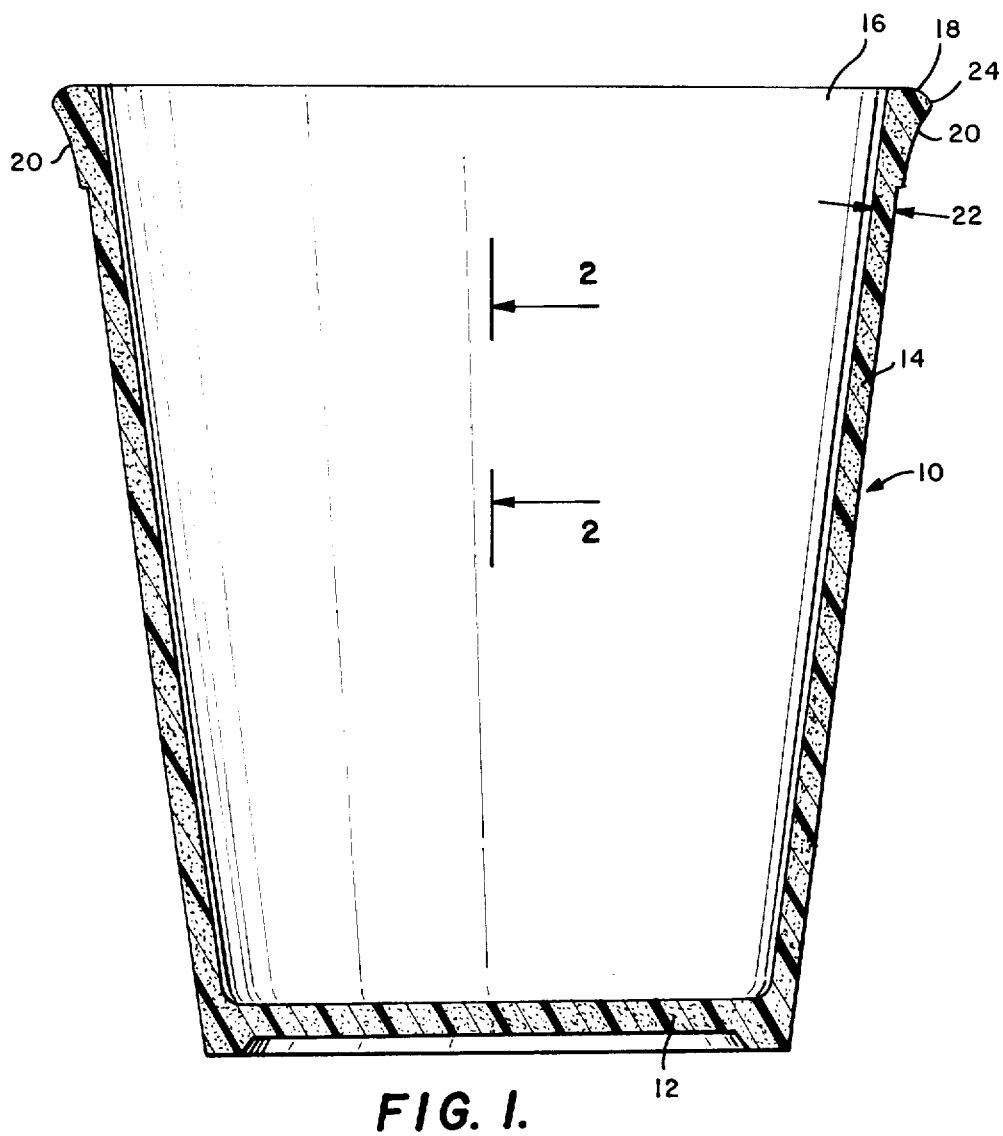
FIG. 1 is an enlarged vertical sectional view of a plastic foam cup in accordance with the present invention.

As shown in FIG. 1 of the drawings, a plastic foam cup generally designated 10 is provided with a bottom 12 and a generally annular side wall structure 14. The side wall structure 14, together with the bottom 12, as shown in FIG. 1, forms a generally inverted frusto conical structure. The cup opposite from its bottom 12 is provided with an open end portion 16 having a surrounding lip structure 18. The lip structure 18 is provided with a surrounding concave portion 20 which extends from a thin wall portion 22 having a thickness approximately 0.070 inches. The concave portion 20 extends from this thin wall portion to an edge 24 of the lip 18 which is of a thickness almost twice the thickness of the wall portion 22.

The length of the concave portion 20 in a vertical direction, as shown in FIG. 1, equals at least a dimension which is three times the thickness of the wall 22.

While the preferred thickness of the wall is 0.070 inches, this wall thickness at 22 may range between 0.065 inches and 0.075 inches. Thus, the side wall of the cup of the invention is substantially thinner than conventional prior art cups which generally measure approximately 0.090 inches.

Figure 2:
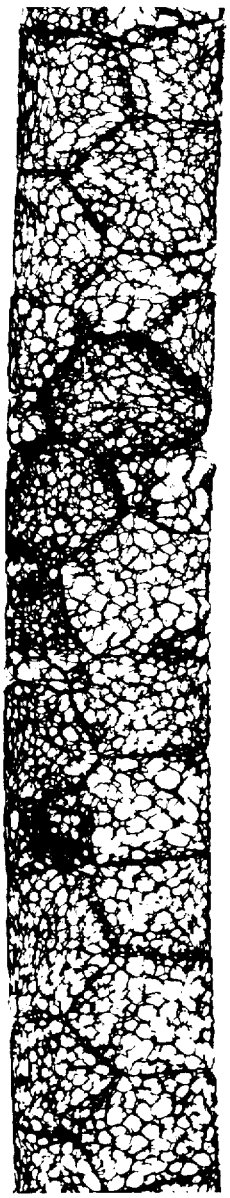
FIG. 2 is a microphotographic view of a section of the wall of a cup of the invention taken generally on line 2—2 of FIG. 1, and showing the actual wall thickness of a cup in accordance with the present invention magnified 20 to 1, and showing foamed beads fused together in the wall section of the cup, said beads being foamed sytrofoam beads.

As shown in FIG. 2, the cross-section of the wall 14 is filled with foamed plastic beads which are fused together. These beads are generally designated 26, and it will be seen that an aggregate of the dimensions A and B of one of the beads 26 may establish the average diameter of such beads. It will be observed that the average diameter of the various beads 26 may be slightly more than half the overall thickness of the cup wall which is generally indicated at C in FIG. 2 of the drawings. This dimension C, as hereinbefore pointed out, is preferably a thickness of approximately 0.070 inches.

As shown in FIG. 2 of the drawings, the foamed beads 26 are fused together to form the wall structure 14. These beads are of an average diameter, in accordance with the aggregate of the dimensions A and B. This average diameter is substantially more than half the thickness or the dimension C of the wall structure 41. Accordingly, the thickness of the wall structure does not exceed a dimension which is twice the average diameter of said foam beads, however, the thickness of the wall structure at C may be less than twice the average diameter of said foamed beads.

Figure 3:
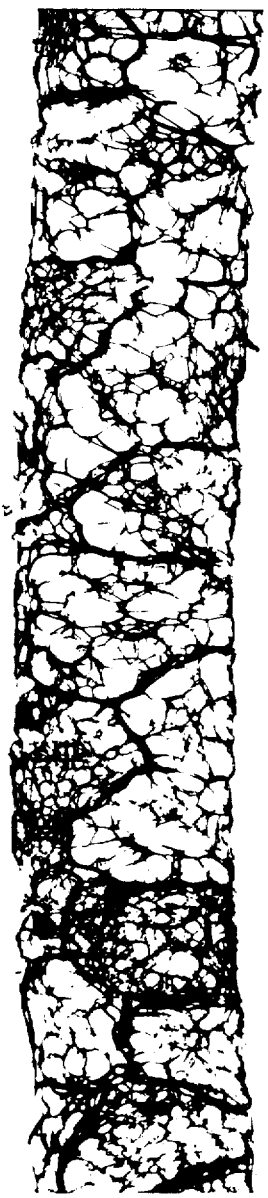
FIG. 3 is a view similar to FIG. 2, but showing foamed plastic beads of a material dissimilar to that as shown in FIG. 2, but having substantially larger foam cellular structure, and having foamed beads substantially the same size as those shown in FIG. 2.

As shown in FIG. 3 of the drawings, the wall structure of the foamed plastic cup of the invention may be made of foamed beads 28 formed of a material different from that used in the structure shown in FIG. 2. These foamed beads 28 having dimensions D and E which may generally indicate an aggregate or average diameter of the foamed beads 28 in the wall structure 14, shown in FIG. 3. These foamed beads 28 are also of an average diameter which do not exceed a dimension twice the average diameter of the foamed beads, and therefore, the wall thickness C, as shown in FIG. 3, is a dimension preferably around 0.070 inches, and less than twice the average diameter of said foamed beads 28.

The density of the wall structure, shown in FIGS. 2 and 3 ranges between 55 and 65 grams per liter, and while the preferred dimension C, as shown in FIGS. 2 and 3, is 0.070, these wall thickness dimensions may range between 0.065 inches and 0.075 inches.

METHOD OF THE INVENTION

The method of the present invention provides for the production of a thin walled dense plastic foam cup having wall structures, as shown in FIGS. 2 and 3, and which have dense smooth outer surface portions 30, as shown in FIGS. 2 and 3 of the drawings.

The method of the invention includes the use of foamable plastic beads, as for example, styrofoam plastic beads or any equivalent material.

A primary step of the method of the invention is the selection of a mass of plastic beads having a foaming agent therein. The mass including plastic beads of a size, such that 75 percent to 85 percent of said mass comprises beads of approximately 40 mesh per inch size and 15 percent to 20 percent of said mass includes beads of approximately 45 mesh per inch size.

The foregoing mass of beads is then subjected to sufficient heat to expand the beads to a size ranging from 14 mesh to 30 mesh size, and a density ranging between 68 and 80 grams per liter. These partially expanded beads are then introduced into a cavity of a mold, wherein the walls of the cavity are spaced apart a distance ranging between 0.065 and 0.085 inches. The preferred spacing of the walls being approximately 0.065 to 0.070 inches.

A quantity of said partially expanded beads that are introduced into the mold, being sufficient to fill the mold when the beads are further expanded therein to an average diameter slightly greater than half the distance between the spaced apart walls of the cavity. The partially expanded beads are introduced into the mold, and the mold is heated to cause said further expansion of the beads.

The further expanding beads in the mold are then subjected to the action of steam introduced into the cavity of the mold to substantially finish the said further expansion of the beads, and the pressure of the steam is maintained in a range between 28 P.S.I. and 32 P.S.I.

The steam is then shut off and the mold is cooled, whereupon a plastic cup having a density ranging between 55 and 65 grams per liter may subsequently be removed from the mold.

In accordance with the foregoing method, it will be understood that the selection of the mass of foamable plastic beads comprises a discrimination between the bead sizes so that relatively small beads are selected which are in the 40 to 45 mesh size. When these beads are expanded between the walls of the cavity which are spaced preferably about 0.065 to 0.070 inches, the beads expand to a diameter as indicated by the aggregate of the A and B dimensions in FIG. 2, and the D and E dimensions in FIG. 3, so that the average diameter of the foamed beads are slightly more than half the wall thickness of the foamed cup at its side wall structure. Thus, the small beads selected for use in the method and the spacing of the mold walls, as well as the control of the steam cooking pressure, result in the production of a very substantial thin walled foam cup having a very dense and smooth outside surface 30 which has few voids, and therefore, a very compatible surface area which may be efficiently printed upon for the purpose of placing advertising matter on the outsides of the cups of the invention.

The dense structure, as shown in FIGS. 2 and 3, has a desirable characteristic in that it may be embossed so that embossing indentations are sharp and well defined. This is due to the fact that the dense structure and the smooth surface 30 readily take a permanent set as compared to the relatively spongy spring-back characteristics of less dense cups.

It will be appreciated that even though the wall structures 14, as shown in FIGS. 2 and 3, are relatively dense as compared to the walls of the prior art cups, these walls are substantially thinner and actually employ less material. For example, a conventional 6 ounce capacity cup of the prior art may weigh 2.5 grams, while a similar cup of the present invention may weigh only 2.2 grams which results in a 0.3 gram saving in weight of material utilized in the production of each cup.

The smooth dense surface 30 is likewise existent at the concave portion 20 of the lip and over the upper portion of the lip 18 so as to provide a very smooth dense and strong lip structure at the open end 16 of the cup 10, shown in FIG. 1 of the drawings.

Even though the wall thickness of the cups of the invention is less than that of prior art cups of comparable capacity, the increased density of the structure of the cup of the invention provides sufficient strength to resist the usual handling, packaging, and ultimate beverage containing use by the customer who may drink liquids from cups produced in accordance with the present invention.

It will be obvious to those skilled in the art that various modifications of the present invention may be resorted to in a manner limited only by a just interpretation of the following claims.

We claim:

1. A method for producing plastic foam cups, consisting in: selecting a mass of foamable plastic beads with a foaming agent therein, and of a size such that 75 percent to 85 percent of said mass includes beads of approximately 40 mesh per inch size, and 15 percent to 20 percent of said mass includes beads of approximately 45 mesh per inch size; then subjecting said mass of beads to sufficient heat to partially expand them to a size ranging from 14 to 30 mesh per inch size and a density ranging between 68 and 80 grams per liter; then introducing a quantity of said partially expanded beads into a cavity of a mold, wherein the walls thereof are spaced apart a distance ranging between 0.065 inches and 0.085 inches, then heating said mold to cause expanding of said partially expanded beads in said cavity; and subjecting said expanding beads in said cavity to steam to substantially finish the expansion of said beads to a density ranging between 55 and 65 grams per liter; then shutting off said steam and cooling said mold; and then removing a plastic cup from said mold.

2. A method for producing plastic foam cups, consisting in: selecting a mass of foamable plastic beads with a foaming agent therein, and of a size such that 75 percent to 85 percent of said mass includes beads of approximately 40 mesh per inch size and 15 percent to 20 percent of said mass includes beads of approximately 45 mesh per inch size, then subjecting said mass of beads to sufficient heat to partially expand them to a size ranging from 14 to 30 mesh size and a density ranging between 68 and 80 grams per liter, then introducing a quantity of said partially expanded beads into a cavity of a mold, wherein the walls thereof are spaced apart a distance ranging between 0.065 inches and 0.085 inches, said quantity being sufficient to fill said mold when said beads are expanded to an average diameter slightly greater than half the distance between said spaced apart walls of said cavity; then heating said mold to cause further expanding of said partially expanded beads in said cavity; and subjecting said expanding beads in said cavity to steam to substantially finish the expansion of said beads to a density ranging between 55 and 65 grams per liter; then shutting off said steam and cooling said mold; then removing a plastic cup from said mold.

3. A method for producing plastic foam cups, consisting in: selecting a mass of foamable plastic beads with a foaming agent therein, and of a size such that 75 percent to 85 percent of said mass includes beads of approximately 40 mesh per inch size and 15 percent to 20 percent of said mass includes beads of approximately 45 mesh per inch size; then subjecting said mass of beads to sufficient heat to partially expand them to a size ranging from 14 to 30 mesh size and to a density ranging between 68 and 80 grams per liter; then introducing said partially expanded beads into a cavity of a mold, wherein the walls thereof are spaced apart a distance ranging between 0.065 inches and 0.085 inches; then heating said mold to cause further expanding of said beads in said cavity; and subjecting said expanding beads in said cavity to steam to substantially finish the expansion of said beads to a density ranging between 55 and 65 grams per liter, while maintaining said steam in a range of pressures between 28 P.S.I. and 32 P.S.I.; then shutting off said steam and cooling said mold; and then removing a plastic cup from said mold.

4. A method for producing plastic foam cups, consisting in: selecting a mass of foamable plastic beads with a foaming agent therein, and of a size such that 75 percent to 85 percent of said mass includes beads of approximately 40 mesh per inch size and 15 percent to 20 percent of said mass includes beads of approximately 45 mesh per inch size; then subjecting said mass of beads to sufficient heat to partially expand them to a size ranging from 14 to 30 mesh per inch size; and a density ranging between 68 and 80 grams per liter; then introducing a quantity of said partially expanded beads into a cavity of a mold, wherein the walls thereof are spaced apart a distance ranging between 0.065 inches and 0.085 inches, said quantity being sufficient to fill said mold when said beads are expanded to an average diameter slightly greater than half the distance between said spaced apart walls of said cavity; then heating said mold to cause further expanding of said partially expanded beads in said cavity; and subjecting said expanding beads in said cavity to steam to substantially finish the expansion of said beads to a density ranging between 55 and 65 grams per liter, while maintaining the pressure of said steam in a range between 28 P.S.I. and 32 P.S.I.; then shutting off said steam and cooling said mold, and the removing a plastic cup from said mold.

5. A product produced by the method of claim 1.

* * * * *